United States Patent
Schabel et al.

(10) Patent No.: US 10,711,202 B2
(45) Date of Patent: Jul. 14, 2020

(54) PROCESS AND APPARATUS FOR PRODUCING PETROLEUM PRODUCTS

(71) Applicant: RES POLYFLOW LLC, Chagrin Falls, OH (US)

(72) Inventors: Jay Schabel, Chagrin Falls, OH (US); Richard A. Schwarz, Akron, OH (US); Charles W. Grispin, Akron, OH (US); Mehmet A. Gencer, Brecksville, OH (US); Joseph D. Hensel, Macedonia, OH (US)

(73) Assignee: RES POLYFLOW LLC, Chagrin Falls, OH (US)

( * ) Notice: Subject to any disclaimer, the term of this patent is extended or adjusted under 35 U.S.C. 154(b) by 331 days.

(21) Appl. No.: 15/473,569

(22) Filed: Mar. 29, 2017

(65) Prior Publication Data

US 2017/0283706 A1    Oct. 5, 2017

Related U.S. Application Data

(60) Provisional application No. 62/315,639, filed on Mar. 30, 2016.

(51) Int. Cl.
*C10G 1/10*    (2006.01)
*C10B 47/06*    (2006.01)
(Continued)

(52) U.S. Cl.
CPC ............... *C10G 1/10* (2013.01); *C08J 11/12* (2013.01); *C10B 5/00* (2013.01); *C10B 7/10* (2013.01);
(Continued)

(58) Field of Classification Search
CPC .................................................. C10B 47/06
See application file for complete search history.

(56) References Cited

U.S. PATENT DOCUMENTS 3,390,719 A  *  7/1968  McCallister ............ C10G 9/20
                                                      165/103
4,123,322 A    10/1978  Rotter
                        (Continued)

FOREIGN PATENT DOCUMENTS

EP    0162802 A2    11/1985
EP    1647589 A2     4/2006
                    (Continued)

OTHER PUBLICATIONS

International Search Report (ISR) for corresponding PCT application No. PCT/US2017/024872, dated Mar. 23, 2018.
(Continued)

*Primary Examiner* — Derek N Mueller
(74) *Attorney, Agent, or Firm* — Hudak, Shunk & Farine Co. LPA

(57) ABSTRACT

A process and an apparatus for pyrolysis of mixed plastic feedstock producing petroleum products are described. In one example, a process for producing petroleum products includes charging feedstock of mixed polymer materials into a reactor apparatus. Heat energy is applied to the feedstock while advancing the feedstock through the reactor apparatus in an anaerobic operation. The energy input to the reactor apparatus is controlled by controlling a temperature gradient within the reactor vessel to produce petroleum gas product. The process involves in situ chemical reactions comprising cracking and recombination reactions that that are controlled to convert solid hydrocarbonaceous portion of the feedstock to molten fluids and gases inside the reactor vessel and to produce gaseous petroleum products which exit the reactor vessel. The separated solid residue from the pyrolysis process is also removed from the reactions vessel.

35 Claims, 11 Drawing Sheets

(51) Int. Cl.

| | | |
|---|---|---|
| *C08J 11/12* | (2006.01) | |
| *C10B 47/44* | (2006.01) | |
| *C10B 47/32* | (2006.01) | |
| *C10B 47/18* | (2006.01) | |
| *G05D 23/00* | (2006.01) | |
| *G05D 23/19* | (2006.01) | |
| *C10G 1/00* | (2006.01) | |
| *C10B 5/00* | (2006.01) | |
| *C10B 7/10* | (2006.01) | |
| *C10B 45/00* | (2006.01) | |
| *C10B 49/02* | (2006.01) | |
| *C10B 53/07* | (2006.01) | |
| *C10G 1/02* | (2006.01) | |

(52) U.S. Cl.
CPC .............. *C10B 45/00* (2013.01); *C10B 47/06* (2013.01); *C10B 47/18* (2013.01); *C10B 47/32* (2013.01); *C10B 47/44* (2013.01); *C10B 49/02* (2013.01); *C10B 53/07* (2013.01); *C10G 1/008* (2013.01); *C10G 1/02* (2013.01); *G05D 23/00* (2013.01); *G05D 23/1932* (2013.01); *C10G 2300/1003* (2013.01); *C10G 2400/02* (2013.01); *C10G 2400/04* (2013.01); *C10G 2400/06* (2013.01); *Y02P 20/143* (2015.11)

(56) References Cited

U.S. PATENT DOCUMENTS

| | | | |
|---|---|---|---|
| 5,057,189 | A | 10/1991 | Apffel |
| 6,288,274 | B1 | 9/2001 | DeCoster et al. |
| 7,344,622 | B2 | 3/2008 | Grispin |
| 7,883,605 | B2 | 2/2011 | Grispin |
| 8,137,871 | B2 | 3/2012 | Zable et al. |
| 8,282,787 | B2 | 10/2012 | Tucker |
| 8,641,871 | B2 | 2/2014 | Grispin |
| 9,074,140 | B2 | 7/2015 | Fraczak et al. |
| 9,624,439 | B2 | 4/2017 | Bakaya et al. |
| 2012/0214113 | A1 | 8/2012 | Kulprathinpanja et al. |
| 2016/0017232 | A1 | 1/2016 | Ullom |
| 2016/0040073 | A1 | 2/2016 | Bakaya et al. |
| 2017/0073584 | A1 | 3/2017 | Bordynuk |

FOREIGN PATENT DOCUMENTS

| | | | |
|---|---|---|---|
| EP | 2457977 | A2 | 5/2012 |
| WO | 2006043924 | A1 | 4/2006 |
| WO | 2010116211 | | 10/2010 |
| WO | 2013123377 | A1 | 8/2013 |
| WO | 2014023854 | A1 | 2/2014 |
| WO | 2016042213 | A1 | 3/2016 |

OTHER PUBLICATIONS

International Search Report for corresponding PCT application PCT/US2017/024872 dated Nov. 14, 2017, 12 pages.
Abbas et al., "Pyroysis of High-Density Polyethylene for the Production of Fuel-like Liquid Hydrocarbon" Iraqi Journal of Chemical and Petroleum Engineering (IJCPE), vol. 9, No. 1, Mar. 2008, pp. 23-29.
Almeida et al., "Thermal and Catalytic Pyrolysis of Plastic Waste" Polimeros, vol. 26, No. 1, Jan.-Feb. 2016, pp. 45-51, Sao Carlos, Brasil.
Sharuddin, Abnisa, Daud, Aroua, "A Review on Pyrolysis of Plastic Wastes" Energy Conversion and Management, vol. 115, May 2016, pp. 308-326.
Pacific Pyrolysis—2010—Biomass Pyrolysis—http://pacificpyrolysis.com/technology.html.
Donaj, Pawal J. et al., "Pyrolysis of Polyolefins for Increasing the Yield of Monomers Recovery", Waste Management, 2012, pp. 840-846, vol. 32, Elsevier Ltd.
United Nations Environmental Programme (UNEP), Converting Waste Plastics Into a Resource, 2009, pp. 1-46, Division of Technology, Industry and Economics International Environmental Technology CentreOsaka/Shiga, Japan.
Waste Management World, "Waste Plastic to Fuel Pilot Project in India", Aug. 6, 2010, https://waste-management-world.com/a/waste-plastic-to-fuel-pilot-project-in-india.

\* cited by examiner

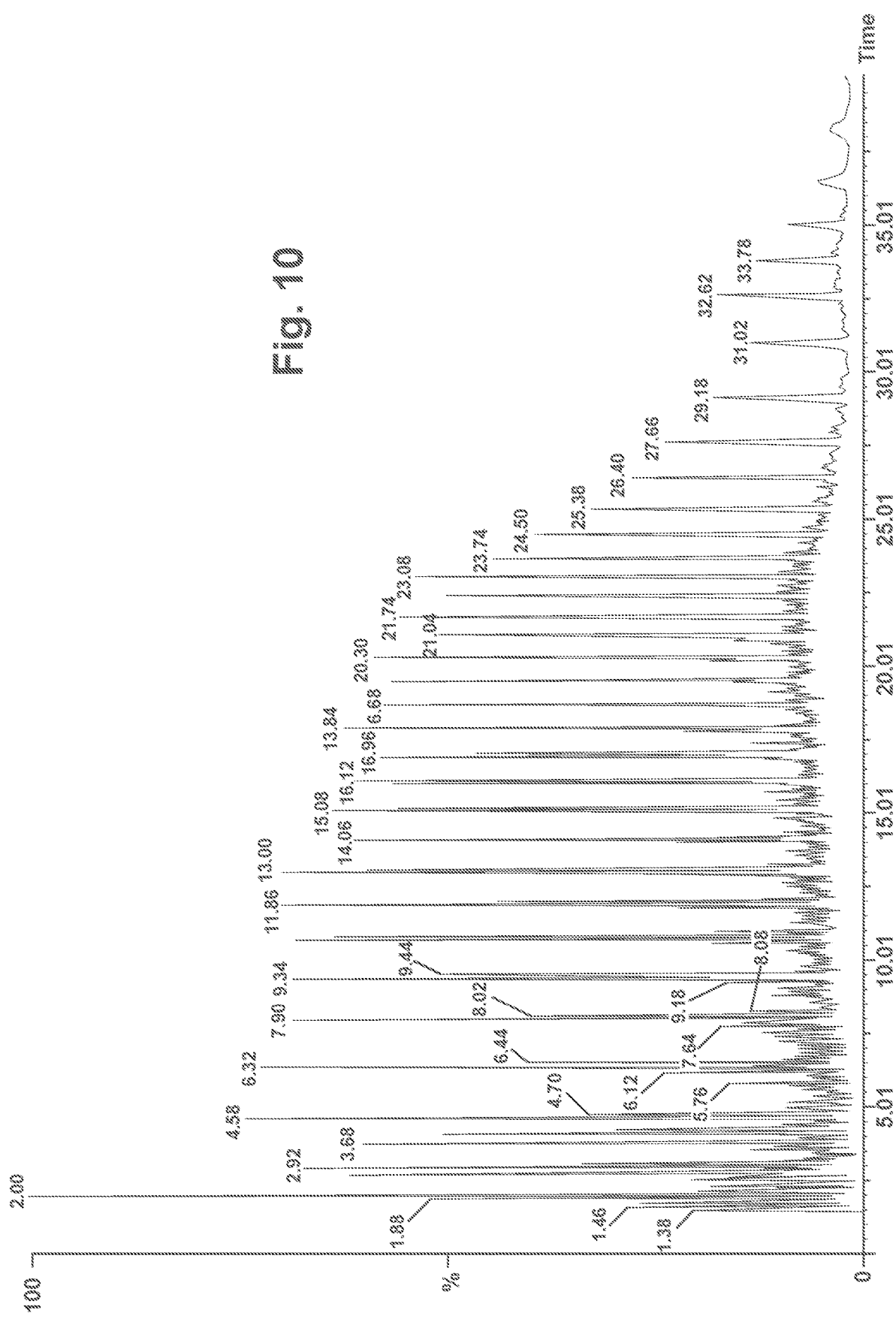

PROCESS AND APPARATUS FOR PRODUCING PETROLEUM PRODUCTS

CROSS REFERENCE TO RELATED APPLICATION

This provisional/utility application claims priority to U.S. Provisional Application No. 62/315,639 entitled Pyrolysis Process, Apparatus, and System for Producing Petroleum Product and was filed on Mar. 30, 2016, the entire content of which is incorporated by reference herein.

TECHNICAL FIELD

The present invention relate generally to a process, apparatus, and system for producing petroleum products from feedstock containing polymers and an apparatus and system for carrying out the process. The present invention also relates to a controller for managing the process of producing petroleum products.

BACKGROUND OF THE INVENTION

In the petroleum industry, commercially viable liquid products are produced from a variety of raw materials. These materials must be converted efficiently and with a consistent quality to meet market price and quality requirements. Plastic waste has traditionally been disposed of in a landfill or incinerated for the heat value due to the difficulty in economically sorting polymer types and consistently converting the material into fungible liquid products. Both the landfill and incineration pose environmental disadvantages and a low value and/or high cost solutions for this energy abundant feedstock.

A pyrolysis process is an example of a thermal decomposition process which has shown promise in efficiently converting the plastic waste streams into gases which can then be condensed into liquids for further processing into petroleum products and petrochemical products. Pyrolysis technologies have been unable to convert the full range of plastics in the waste stream which then requires that some level of sorting be performed in preparation of the feedstock, thus reducing the economic viability. In addition, due to changes in the plastic waste stream, many pyrolysis technologies have not been able to produce a consistent end product capable of being upgraded to petroleum products that can consistently meet required industry specifications. Such out of spec products require further processing which consumes great amounts of energy thus further reducing the economic viability.

While there are several methods currently available for generating petroleum products, there are drawbacks to such methods in terms of energy consumption, product yield and quality of the products produced.

SUMMARY OF THE INVENTION

In one aspect of the present invention a process for producing petroleum products includes charging feedstock comprising mixed polymer materials into a reactor vessel of a reactor apparatus; applying heat to the reactor vessel while advancing the feedstock through the reactor apparatus in an anaerobic operation; controlling the energy input to the reactor vessel and controlling a temperature gradient within reactor vessel to produce a condensable petroleum gas product. The process for producing condensable petroleum gas products involves in situ chemical reactions that are managed to convert feedstock to solid inert residue, molten fluids and gases inside the reactor vessel and to produce condensable petroleum gas products which exit the reactor vessel.

In another aspect of the present invention a process for producing petroleum products includes charging feedstock comprising mixed polymer materials into a reactor apparatus having a plurality of sequential reactor zones; applying heat energy to the reactor vessel while advancing the feedstock and products generated from the feedstock through the reactor apparatus; independently controlling the heat energy input to each of the plurality of sequential reactor zones and controlling a temperature gradient within each of the plurality of sequential reactor zones of the reactor apparatus.

In another aspect of the present invention a reactor apparatus for carrying out the thermal cracking of mixed polymer materials includes a reactor vessel, an outer shroud surrounding the reactor vessel, defining a channel or plenum that conveys exhaust gas between the reactor vessel and the outer shroud of the reactor apparatus. In another example embodiment the reactor apparatus includes an inner wall that extends between the reactor vessel and the outer shroud to define a first channel of a first reactor zone and a second channel or plenum of a second reactor zone for separately conveying exhaust gas between the reactor vessel and the outer shroud of the reactor apparatus.

Another aspect of the present invention provides a means for controlling the thermal cracking and recombination reactions in a reactor apparatus, including manual or automatic control of the mass flow rates and temperature profiles in each reactor zone.

In another aspect of the present invention a system for producing petroleum products includes a reactor apparatus and a controller in communication with the reactor apparatus for controlling a process for producing petroleum products. The controller transmits and receives signals to the reactor apparatus to control several operating parameters of the reactor apparatus, the operating parameters includes the temperature profile within the reactor vessel along at least two axes.

In another aspect of the present invention controller for controlling a process for producing petroleum products includes a first control port for receiving a data from a first reactor zone and a first communications port for transmitting data to the first reactor zone of the reactor apparatus. The computing device includes a processing unit in communication with the first control port and the first communications port, and the processing unit includes control logic. The control logic is capable of receiving a data signal of the first control port that includes a temperature reading of a gas product in the first reactor zone and determining at least one of the heat input rate in the first reactor zone and the mass flow rate of at least one of the exhaust gas and product gas exiting the reactor apparatus in the first reactor zone.

BRIEF DESCRIPTION OF THE DRAWINGS

The foregoing and other features of the present disclosure will become apparent to those skilled in the art to which the present disclosure relates upon reading the following description with reference to the accompanying drawings, in which:

FIG. 10 illustrates a graph of a liquid petroleum chromatograph trace of a condensable portion of the gas stream produced from a process for producing petroleum products, according to an example of the present invention.

DETAILED DESCRIPTION

Figure 1:
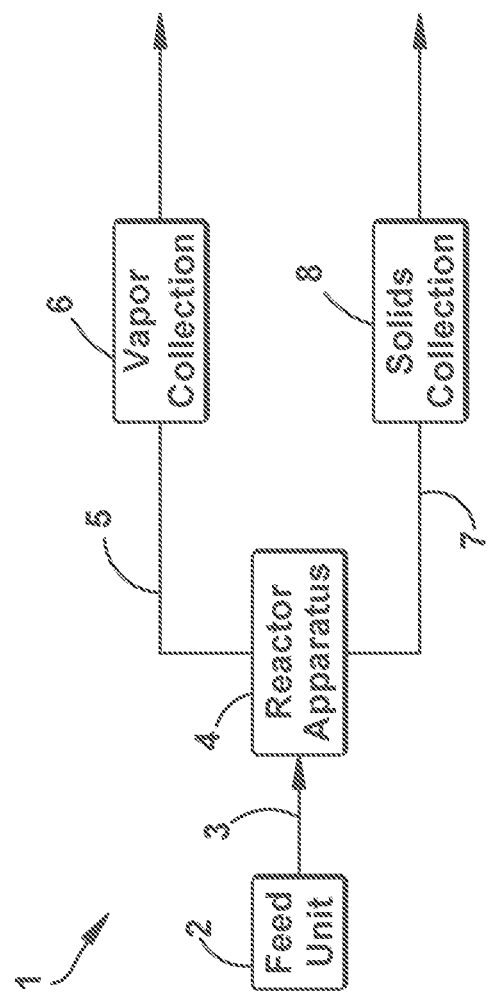
FIG. 1 is a schematic flow diagram of a process for making petroleum products, according to an example of the present invention.

The various examples of a process for producing petroleum products, a reactor apparatus and systems of the present invention relate generally to processes and equipment that convert mixed polymer materials, including but not limited to mixed polymer waste, to a consistent quality output of fungible petroleum products. These fungible petroleum products include, but are not limited to naphtha; distillate, (e.g. diesel); and gas oil (e.g. heavy oil and wax). The processes for producing petroleum products herein can yield at least 50%, in another example from about 50% to about 90%, in another example from about 60 to about 90%, and in another example from about 70% to about 90% fungible products. Example embodiments of the process herein can produce at least about 55% from about 60% to about 90%, in another example from about 70% to about 92% condensable gas based on the gas product generated by the process.

The process for producing petroleum products involves pyrolysis of a feedstock comprising mixed polymer and in situ reactions that produce solid inert residue, molten fluids, and gases inside the reactor vessel. A solid inert residue stream and a gas product stream exit the reactor. The mass conversion of the feedstock to condensable and non-condensable gas products occurs within the reactor vessel. Up to about 100% by weight of the condensable gas product is converted to usable fuel product, and up to 100% of the non-condensable gas can be used for fuel.

The term "feedstock" as used herein refers to a material that contains a mixture of at least two different polymers used during the process of producing petroleum products. Feedstock includes, but is not limited to, polymer scrap.

The term "polymer scrap" as used herein, refers to post-manufacturing and post-consumer plastic that is no longer needed for its intended purpose. For example, the post-consumer plastic is typically a three-dimensional product that was generated by heat treatment and deformation, e.g. molding, extrusion, etc. of virgin plastic.

The term "hydrocarbonaceous material" as used herein, refers to a material, for example feedstock material, which contains carbon and hydrogen atoms.

The term "molten material" as used herein, refers to material that is partially melted into a liquid with some solid or only partially melted material."

The term "pyrolysis" as used herein, refers to the thermal decomposition of organic material at elevated temperatures and can be in the presence of low levels of oxygen gas, for example, less than 10% oxygen.

The term "thermal decomposition" as used herein, refers to a process in which higher molecular-weight polymeric materials are broken down into materials of lower molecular weight.

The term "thermal cracking" as used herein, refers to a process occurring in the vapor space in which higher molecular-weight organic materials, for example oligomers, are further broken down into organic materials of lower molecular weight.

The term "recombination reactions" as used herein, refers to a chemical process occurring in the vapor space in which smaller molecular fragments react to form larger higher molecular weight materials.

The term "anaerobic" refers to an environment which has a low, for example, less than 3%, less than 2%, less than 1% or near-zero, oxygen gas, $O_2$, or "free" or "unbound" oxygen based on the volume of gas in the environment.

The term "solid inert residue" as used herein, refers to solid material which is formed or remains solid during thermal decomposition of the feedstock.

The term "gas" as used herein, refers to all gas including condensable gas, non-condensable gas, and superheated gas.

The term "fluid" herein refers to material that is a gas, a liquid, a slurry, or a molten mass.

The term "solids" as used herein refers to a material that is firm and stable in shape and is not a liquid or a gas. Examples of solids include feedstock material and solid inert residue.

The term "batch process" herein is a process in which all the reactants are placed in the reactor at the beginning of the process and is then processed according to a predetermined course of reaction during which no material is fed into or removed from the reactor.

The term "continuous process" herein refers to a process in which reactants are introduced and products are withdrawn simultaneously in a continuous manner.

The term "semi-continuous process" herein refers to a process that fits neither a batch or continuous process. For example, a semi-continuous process can include a process in which some of the reactants are charged at the beginning whereas the remaining are fed continuously as the reaction progresses. Another example is similar to a batch reactor except one or more of the products is removed continuously.

In another example, the process is similar to a continuous process in which the reactants are fed continuously as the reaction progresses and the products are removed intermittently.

The term "catalyst" as used herein refers to a material that speeds up the kinetics of a reaction.

The term "no added catalyst" as used herein refers to a process for producing petroleum products that has no added catalyst material to the process, for example no catalyst that is added to the feedstock or added to the reactor vessel for carrying out the process.

The term "heat rate" as used herein refers to the heat applied per time in the reactor vessel.

The term "heat flux" as used herein refers to the heat rate applied per unit area of the heated surface which the material contacts.

The term "yield" as used herein is defined as the mass of gas product condensed per the mass of the feedstock. The yield=(mass of condensed gas product/mass of the feedstock)×100. For example, if the mass of condensed gas product is 50 kg and the mass of the feedstock is 75 kg then the yield is 66.7%.

The term "controlled consistency" as used herein refers to the ability to maintain control of the composition of condensable fuel products, for example Naphtha, Distillate and Gas Oil, given a variation in feedstock composition.

FIG. 1 is a process flow diagram 1 of a process for producing petroleum products according to an aspect of the present invention. Feed unit 2 contains feedstock material that flows along feedstock stream 3 to reactor apparatus 4. The thermal decomposition process, for example a pyrolysis process, which takes place within reactor apparatus 4 converts feedstock to a petroleum gas product stream 5 which exits the reactor apparatus and is collected in gas collection unit 6. The collected gas can be condensed and stored in a product storage tank (not shown). A solid inert residue stream 7 also exits reactor apparatus 4 and collected in solids collection unit 8. Both the collected gas and collected solids can undergo further post-processing. Feed unit 2 can be, for example, an auger that advances the feedstock material toward the reactor apparatus at a predetermined feed rate, and feed unit can optionally provide heat to the feedstock. It is found herein, that the process for making petroleum products can yield consistent quality product in a batch, a semi-continuous, and a continuous process when the feed rate is varied during the reaction. The process can also yield consistent quality product when the feedstock composition varies during the process The process provides a series of gas cracking reactions combined with condensation and recombination reactions to achieve desired gas product compositions exiting the reactor apparatus. In any of the examples herein, the process can be executed in a batch process, continuous process or semi-continuous process. In any of the examples herein, the process of producing petroleum products includes the management of the reaction chemistry in the reactor vessel, whether the management of the reaction chemistry takes place in a one reaction zone of the reactor apparatus or in a plurality of reaction zones encompassed within a single reactor vessel. In any of the example embodiments herein the process for producing petroleum products uses no added catalyst to carry out the process.

In one example embodiment of the invention, a continuous process converts mixed waste plastics to fungible petroleum products, e.g. naphtha, distillate, wax and gas oil, through pyrolysis and simultaneous gas phase cracking and recombination reactions. It has been found herein that the energy distribution can be controlled to influence the various cracking and recombination reactions occurring in the reaction vessel and this energy distribution can be controlled in a variety of ways. For example, energy distribution can be controlled by controlling the heat input to the reactor vessel, and by controlling the temperature gradient in the reactor vessel. The temperature gradient can be controlled by controlling the heat input and by controlling the heat withdrawal of the reactor vessel. The heat withdrawal can be controlled, for example, by controlling the flow rate and/or the temperature of gas that passes by and/or contacts the outside surface of the reactor vessel of the reactor apparatus. In another example, the energy distribution can be controlled by controlling the heat input and by independently controlling the temperature gradient in a plurality the reactor zones of a reactor apparatus vessel. The design of the reactor apparatus and process enable a series of controlled pyrolysis and controlled gas phase cracking and recombination reactions to produce petroleum products with controlled consistency utilizing mixed feedstocks that can vary in composition.

Heat energy can be independently applied and withdrawn from a single reactor vessel or a reactor vessel comprising a plurality of sequential reactor zones. A temperature gradient within a reactor apparatus and/or within each of the sequential reactor zones between the bottom surface of the reactor vessel to the top portion of the reactor at a reactor outlet port. It has been found that the processes disclosed herein produce petroleum products of desired composition distributions from a wide variety of mixed polymers, including mixed polymer scrap. Feedstock of inconsistent composition mixtures can produce substantially the same targeted distribution of the same product compositions, i.e. the desired "composition distribution." For example, the products produced by the process herein can include target compositions, the desired percentage range of each of naphtha, distillate, wax, gas oil. The examples below show the controlled consistency in the petroleum product. For example, the composition of hydrocarbonaeous feedstock material can vary from about 10% to about 70% polyethylene, from about 10% to 70% polypropylene, from about 10% to about 30% polystyrene and from about 0% to 30% of other commonly use polymeric materials, including but not limited to, polyvinyl chloride, polyester, polycarbonate, polymethyl methacrylate, nylon and the like. In another example, the feedstock comprises at least 60% by weight mixed polymer scrap which comprises at least 65% by weight hydrocarbonaceous material.

Figure 2:
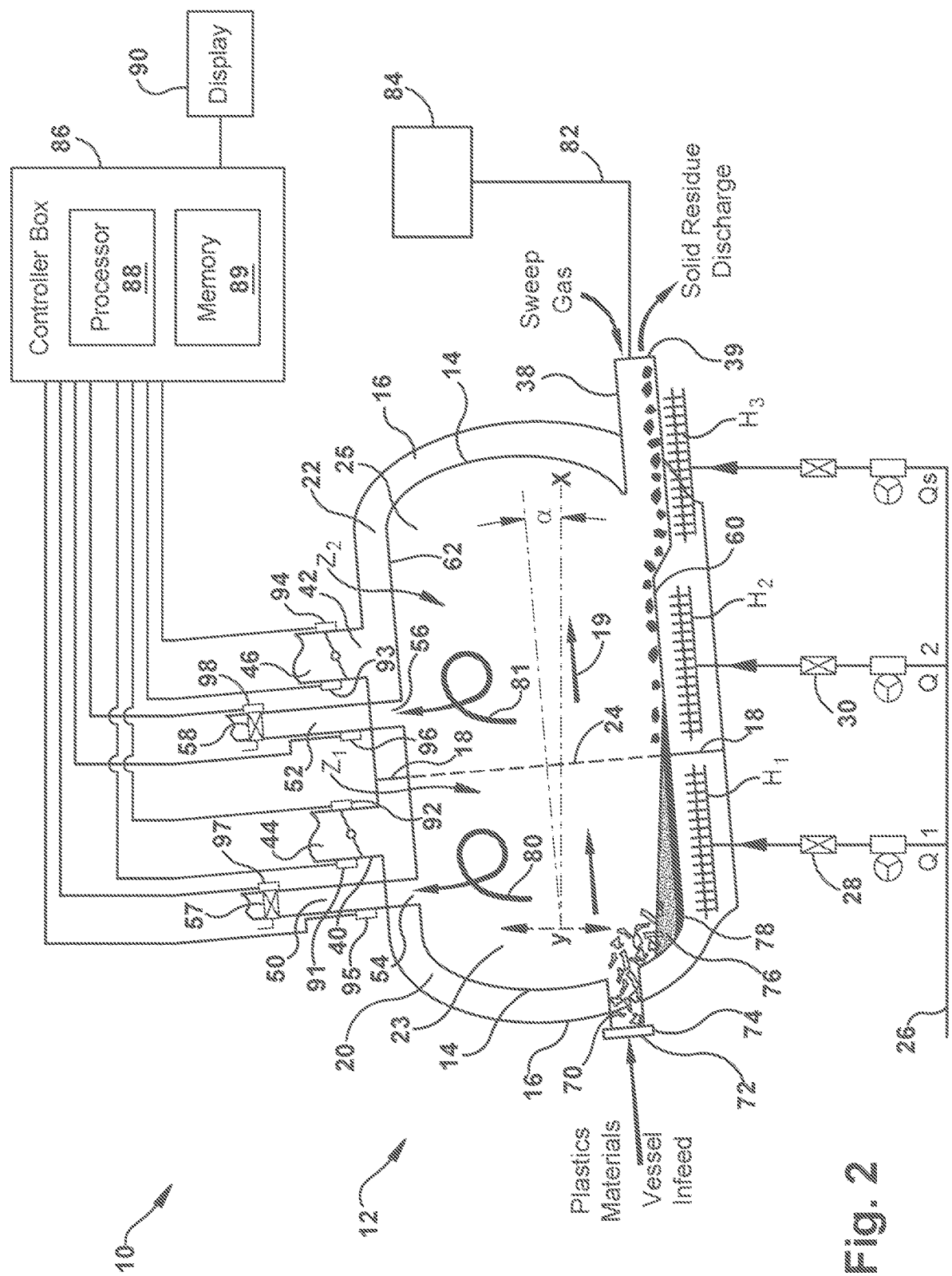
FIG. 2 is a cross-sectional schematic representation of a system for producing petroleum products, according to an example of the present invention.

FIG. 2 is a schematic illustration of a system 10 for carrying out the pyrolysis of mixed polymers, in accordance with one aspect of the present invention. In one example, system 10 includes reactor apparatus 12 which is a double-walled apparatus that includes non-rotating reactor vessel 14 and an outer shroud 16 substantially surrounding the reactor vessel 14. In an embodiment, the reactor apparatus 12 is a non-rotating apparatus. Outer shroud 16 is spaced a distance, for example a distance that ranges from about 2-20 centimeters, from the reactor vessel 14 and inner wall 18 is an optional separation wall that extends between reactor vessel 14 and outer shroud 16 to define a fluid channels or plenum 20 and 22. When inner wall is present, fluid channels 20 and 22 permit a heat exchange medium, for example, gas fluid, to be circulated or channeled separately along the exterior of reactor vessel 14 between the reactor vessel 14 and the outer shroud 16. Reactor apparatus 12 optionally includes insulation along the exterior of the outer shroud to reduce thermal losses and improve the thermal efficiency of the process.

As shown in FIG. 2, reactor apparatus 12 has a plurality of reactor zones, for example first reactor zone, $Z_1$, and a second reactor zone, $Z_2$, which are successive and adjacent reactor zones along the horizontal axis, axis X, of the reactor apparatus, for example, from the inlet port to the outlet port. The separate reactor zones $Z_1$ and $Z_2$ are defined by the location of inner wall 18 that extends along the perimeter of outside surface of reactor vessel 14 and which contacts both the reactor vessel 14 and outer shroud 16. Although the reactor vessel 14 is open to flow of feedstocks in the direction of arrow 19 which indicates flow along the horizontal axis of the reactor, the reactor zones $Z_1$ and $Z_2$ of reactor vessel 14 are defined according to the location of the inner wall 18 that separates the fluid channels, fluid channels 20 and 22. As shown, for example, reactor zone $Z_1$ is shown as the upstream portion 23 of reactor apparatus 12, (i.e. indicated upstream of dotted line 24 between inner wall 18), and includes the volume of reactor vessel 14 that is surrounded by fluid channel 20 and also the annular volume of fluid channel 20. Reactor zone $Z_2$ is shown as the downstream portion 25 of reactor apparatus 12, (i.e. indicated downstream of dotted line 24 between inner wall 18), and includes the volume of reactor vessel 14 that is surrounded by fluid channel 22 and also the annular volume of fluid channel 22.

Accordingly, in an example of the present invention a reactor apparatus for carrying out the pyrolysis of mixed polymer materials includes a reactor vessel 14 and an outer shroud 16 surrounding the reactor vessel. An inner wall 18 extends between outer shroud and reactor vessel and defines a first fluid channel 20 and a second fluid channel 22 for separately conveying fluid, for example gas fluid, between the reactor vessel and the outer shroud. Fluid channel 20 is disposed about reactor vessel 14 in the first reactor zone $Z_1$ and fluid channel 22 is disposed about reactor vessel 14 in the second reactor zone $Z_2$ of reactor apparatus 12. Reactor apparatus 12 further includes a plurality of heat sources, for example H1 and H2, which independently provide heat energy $Q_1$ and $Q_2$ to first zone $Z_1$ and second zone $Z_2$, respectively. For example, heat sources $H_1$ and $H_2$ can include a gas burner which is fueled by a gas fuel that flows through conduit 26, the flow of which can be controlled by valves 28, 30. According to one example of the present invention, the heat sources $H_1$ and $H_2$ are disposed inside reactor apparatus 12 between the reactor vessel 14 and outer shroud 16 of reactor zones, $Z_1$ and $Z_2$, respectively, along the horizontal length of reactor apparatus 12, that is, along the horizontal axis. In another example, heat sources $H_1$ and $H_2$ are disposed outside or external to reactor apparatus 12. The heat energy input is independently controlled in each reactor zone, $Z_1$ and $Z_2$ via heat sources $H_1$ and $H_2$ and a temperature gradient is created along a second axis, for example along the vertical axis, within each of the sequential reactor zones. The heat energy per unit mass of feedstock charged to the reactor vessel can range from about 0.5 MJ/kg/hr to about 5 MJ/kg/hr.

The example processes disclosed herein convey mixed polymer materials along a plurality of successive reactor zones which are independently controlled. That is, heat energy is independently applied to and withdrawn from each of the plurality of sequential reactor zones while creating a temperature gradient, for example a temperature gradient along the vertical axis, indicated as axis Y within each of the sequential reactor zones. The temperature gradient or differential from the bottom surface of the pyrolysis vessel 60 that contacts the feedstock to the top portion of the reactor vessel 25 at the exit port 54 of the reactor vessel can range widely, for example from about 50° C. to 450° C., in another example from about 90° C. to about 350° C., and in another example from about 100° C. to about 300° C.

Hot gas flows through the fluid channels 20 and 22. In this example the gas is exhaust gas generated by heat source $H_1$ and which flows through channel 20 is channeled separate from, i.e. it does not mix with, the exhaust gas generated by heat source $H_2$ which flows through channel 22. The reactor apparatus can include an optional heat source, $H_3$, to provide heat energy $Q_3$ to an outlet port 38 having an opening 39 for discharge of solid residue of the process. Heat source $H_3$ can be located internal or external, or both, to the outer shroud 16 of the reactor apparatus. If heat source $H_3$ is a gas burner that is located between reaction vessel 14 and outer shroud 16, the exhaust gas can be circulated in fluid channel 22 of reactor zone $Z_2$, for example. Heat energy is independently applied to and withdrawn from each of the plurality of sequential reactor zones while creating a temperature gradient that is controlled from the molten polymer and/or residual solids at the base portion of the reactor vessel to the gases at the top portion of the reactor vessel.

Reactor apparatus 12 includes channel vents 40 and 42 along outer shroud 16, in each reactor zone $Z_1$ and $Z_2$, respectively. Exhaust vents 40 and 42 further include a flow control device 44 and 46, for example valves, dampers and combinations thereof, to control the discharge of exhaust gas out of channels 20 and 22, respectively. The flow control device may be used to independently regulate or completely shut off the flow of exhaust gas from channels between the reactor vessel and the outer shroud to control energy input and/or withdrawal of each reactor zone for condensing the gas in the reactor vessel and for controlling the cracking reactions and products. It should be understood that a flow control device other than a damper can be used to control venting, and such a device can include but is not limited to a valve, for example. The heat energy withdrawn from each of the plurality of sequential reactor zones can be independently controlled to control the gas cracking and recombination processes and the products obtained from the process.

A gas stream including vapor products exit reactor apparatus 12 through at least one product conduit, for example 50 and 52, of reactor vessel 14. Each product conduit 50, 52 optionally includes a valve, for example valve 54 and valve 56, respectively, for optionally controlling the mass discharge of vapor product and to some degree the gas composition throughout the process. The gas products that exit the reactor vessel are collected for further processing. For example, the average mass flow rate of the petroleum gas product exiting the reactor can ranges from about 0.008 kg/L·hr to about 0.06 kg/L·hr (0.5 pounds/cubic foot per hour to about 3.5 pounds per cubic foot per hour).

In accordance with an example of the present invention the process includes applying heat energy to mixed polymer materials as it is advanced through the reactor apparatus. The process includes independently controlling the heat energy applied to the sequential reactor zones, $Z_1$ and $Z_2$, and independently controlling the heat energy that is withdrawn from the sequential reactor zones $Z_1$ and $Z_2$. The control of heat energy creates a temperature gradient within each reactor zone, for example along a vertical axis, indicated as axis Y, from the base 60 to the top 62 of the reactor vessel 14. The example processes of the present invention disclosed herein, control the heat energy applied and withdrawn, promoting refluxing which provides for a series of condensation, gas cracking and recombination reactions and thus insures the desired composition quality.

Still referring to FIG. 2, feedstock 70 of mixed polymer material, which includes at least two different polymers, is fed through opening 72 of inlet 74 of reactor apparatus 12. As the feedstock 70 is heated and conveyed through the reactor apparatus it undergoes physical transformation to molten polymer 76, solid residue 78 and gas 80 states. The pyrolysis processes described herein control the distinct and interacting regions or interfaces between the molten polymer, residual solids and gas phases. The example processes of the present invention disclosed herein control the rate of gas formation, condensation, and thus the type of molecules produced in the gas phase.

During operation, the temperature of gas generated, indicated as flowing gas streams 80 and 81, inside the reactor vessel 14 substantially exceeds the melting temperature, or glass transition temperatures, of the mixed polymers in the feedstock. The temperature inside reactor vessel 14 will vary from the base 60 of the reactor which is in contact with the polymer melt and residual solids, to the top 62 of the reactor which is contacted by gaseous products.

Thus in one example the process for producing petroleum products includes charging reactor apparatus 12 with feedstock 70 comprising mixed polymer material, and heating the feedstock while advancing the feedstock, and products generated by the feedstock, through the reactor apparatus 12. The heat energy applied to each of the plurality of sequential reactor zones is independently controlled and the heat energy withdrawn from each of the plurality of sequential reactor zones is independently controlled. Products generated by the pyrolysis process and collected from the reactor include gaseous products and residual solids. The gaseous products are collected for further processing, for example hydro-treating, to produce petroleum products such as diesel fuels and naphtha for example.

The process is anaerobic in operation. The term "anaerobic" refers to an environment which has a low, or near-zero, oxygen gas, $O_2$, or "free" or "unbound" oxygen content. That is, upon initial heating of the feedstock entering the reactor apparatus 12 and throughout the pyrolysis process, the reactor vessel 14 contains less than about 3% by volume oxygen, in an alternative embodiment, less than about 2% by volume oxygen, in an alternative embodiment, less than about 1% by volume oxygen, and in yet an alternative embodiment, from about 0.01% to about 1% by volume oxygen, based on the internal volume of the reactor vessel.

The loading of feedstock into reactor vessel 14 of reactor apparatus 12 is controlled to accommodate the size and geometry of the reactor vessel. As the material is conveyed along the reactor vessel and through the successive reactor zones, the mass of molten polymer is reduced and residual solids remain. Heat is applied to the residual solids until it is dry and contains less than about 5% by weight carbon, for example.

The average area of loading of the feedstock takes into account the variations in the bed depth depending upon the reactor geometry. A reactor having a high volume to surface area is desirable, for example, in reactor shapes that are cylindrical, or rectangular, for example, and horizontal, i.e. having a length that is at least two or three times greater than the height. In the example embodiments described herein, the reactor has sufficient depth or diameter to enable formation of a layer of residual solids during pyrolysis and also sufficient head space above the feedstock to enable controlled gas phase cracking and recombination reactions. The reactor has at least about 30% free volume upon initial heating, in some embodiments at least about 60% free volume upon heating, and in alternative embodiment at least about 80% free volume upon heating, and in another embodiment from about 60% to about 99% free volume upon heating.

Product in the form of gaseous products and residual products can be collected from the reactor apparatus. Gaseous products are collected from at least one product conduit, for example conduit 50. The product composition profile can be controlled by controlling the energy input and withdrawal in each of the sequential reactor zones. The total gaseous products produced from reactor apparatus 12 comprises at least about 50%, in another example at least about 82%, in another example at least about 93%, and in another example at least about 96% by weight based on the weight of feedstock. The condensable hydrocarbons, based on the total gaseous products produced, vary from about 50% to about 98% by weight, in another example from about 60% to 90% by weight. For example, the condensable hydrocarbons produced includes from about 10% to about 60%, by weight, of at least one of the three streams for example, naphtha, distillate, or gas oil based on the weight of gaseous products produced. For example the condensable hydrocarbons produced can comprise from about 10% to about 60%, in another example from about 15% to about 35% by weight of naphtha, from about 10% to about 60%, in another example from about 15% to about 35% by weight of distillate and from about 10% to about 60%, in another example from about 15% to about 35% by weight of fuel oil based on the weight of gaseous product.

Controlling the rate of gas formation and the type of molecules in the gas phase through cracking and reformation involves several control variables. For example, control variables include, but are not limited to, the rate of feedstock into the reactor vessel 14, the energy input to the reactor apparatus 12 or reactor vessel 14, the heat flux, the mass flow of the gas out of the reactor vessel 14, flow of gas, for example exhaust gas, along the outside of the reactor vessel, the residual solid layer thickness, horizontal thermal gradient, radial thermal gradient, the shape of the reaction chamber, ratio of residual solid, liquid, foam, gas zones, the location of product gas removal, the vertical temperature gradient, and gas product residence time.

The control of the various parameters may be achieved by at least one of manual, electrical and pneumatic control, whether hard wired or wireless, or fiber optics. Manual control and/or control logic provide a control mechanism for the temperature profile within the reactor vessel in both vertical and longitudinal axes, e.g. axis Y and axis X, respectively, and temperature profile along the arc of the reactor vessel within each reactor zone. Energy input and energy withdrawal occurs within each reactor zone based on several variables, including but not limited to the feed rate, the mixing rate, and the length and depth profile of the mixed polymer melt pool (i.e. molten polymer) within the reactor vessel 14.

At least one temperature sensing element, for example a thermocouple, is disposed within reactor apparatus 12 to provide an output signal which is representative of the temperature of any of reactor products in the gaseous state inside the reaction vessel. Reactor apparatus 12 can include temperature sensors 95 and 96 at or near product conduits 50 and 52, respectively, and also at or near channel vents 40 and 42 along outer shroud 16. The temperature signal can be an electrical signal that is communicated to/applied to the controller, as will be further described. Controller 86 compares this measured temperature with a set point signal and establishes an output signal which regulates flow control devices 44 and 46, valves 54 and 56, and combinations thereof. If the measured temperature should be less than a predetermined temperature control value, the heat sources is adjusted to increase the heat input rate of the first reactor zone. If the measured temperature in a reactor zone is greater than the predetermined temperature control value, then heat damper is adjusted to increase the mass flow rate of plenum gas or exhaust gas through the exhaust vent, for example.

Figure 3:
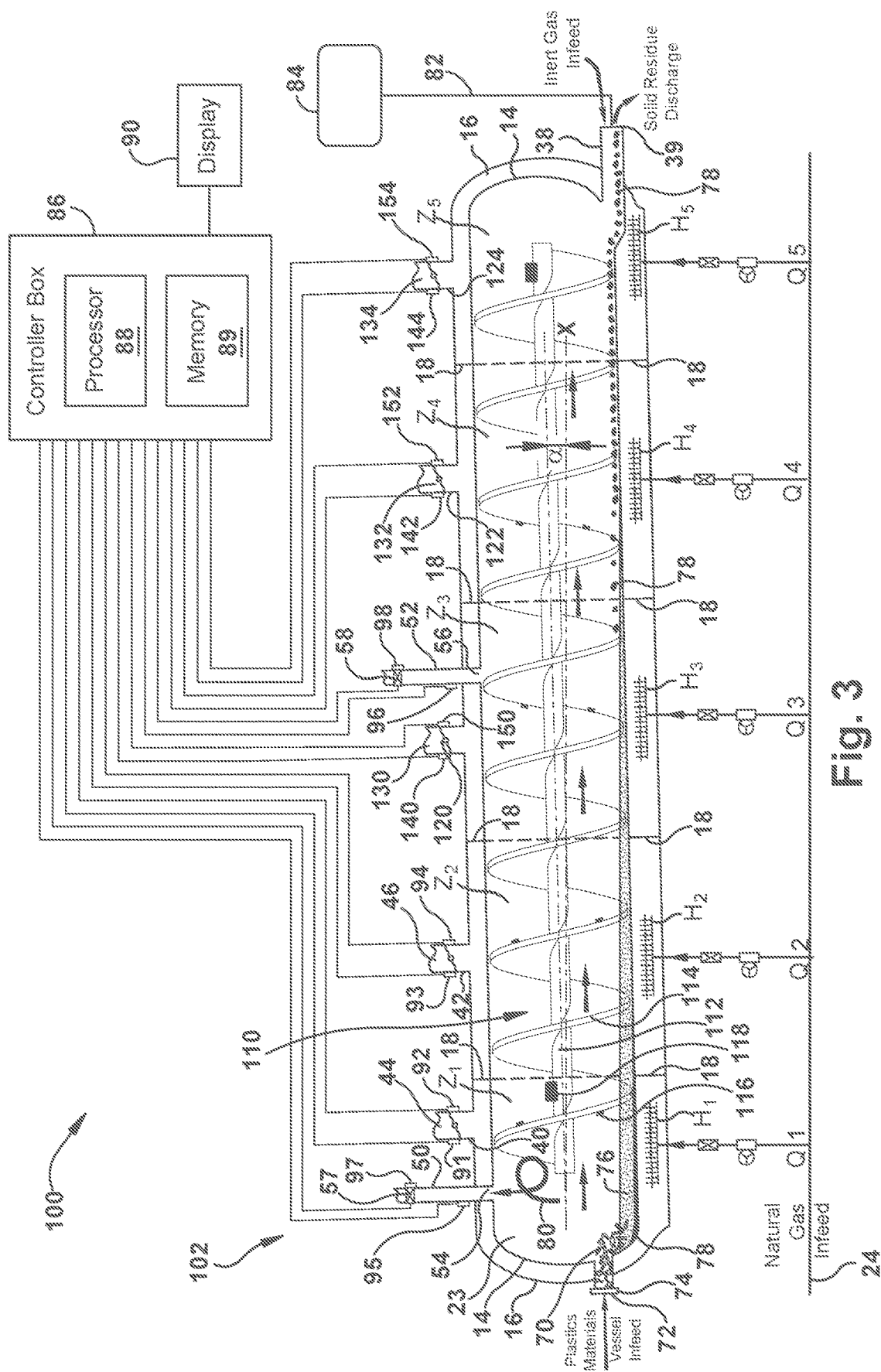
FIG. 3 is a cross-sectional schematic representation of a system for producing petroleum products, according to another example of the present invention.

FIG. 3 is a schematic illustration of a system 100 for carrying out the process for producing petroleum products using feedstock of mixed polymers, in accordance with another example of the present invention. System 100 is similar to system 10 of FIG. 2 and has a reactor apparatus 102 which has five reactor zones, five reactor zone, $Z_1$, $Z_2$, $Z_3$, $Z_4$, and $Z_5$. It should be noted that the number of reactor zones can vary depending upon the product composition distribution to be achieved and the reactor apparatus may include 3 to 10 reactor zones, in another example 5 to 15 reactor zones, for example, each of which can be controlled independently. Each of the successive reactor zones include a wall 18 that defines five flow channels (e.g. plenums) that permit a heat exchange medium, for example exhaust gases, to be circulated or channeled separately along the exterior of reactor vessel 14 between the reactor vessel 14 and the outer shroud 16. Reactor apparatus 102 also includes a plurality of heat sources H1, H2, H3, H4, and H5, respectively that independently fuel the heat to each of the reactor zones and a plurality of temperature sensors 91, 93, 140, 142, and 144. Reactor apparatus 102 also includes exhaust vents 40, 42, 120, 122, and 124, which include flow control devices 44, 46, 130, 132, and 134, for example valves, dampers, and combinations thereof. Apparatus 102 optionally includes sensors 92, 94, 150, 152, and 154 for electrical control of the flow control devices, such as valves, dampers and combinations thereof.

In any of the processes described herein, including for example, the process described above with respect to FIG. 2 and FIG. 3, the feedstock and the products generated by the feedstock can be conveyed along the sequential reactor zones by means of gravity, for example, or by another means of agitation. Reactor apparatus 12 or reactor vessel 14, or both, of FIG. 2 and FIG. 3, can be oriented at an angle, angle α, along the horizontal axis X. In another example the reactor vessel is parallel with the ground and angle, α, is zero. The angle of the horizontal axis of the reactor with respect to the horizontal axis X, angle α, can vary from about 20 degrees to about −20 degrees, in another example from about 10 degrees to about −5 degrees, and in another example from about 5 degrees to about −5 degrees, for example.

Another means of agitation inside reactor vessel 14 can include a variety of mechanical stirrers, including helical screw 112 of FIG. 3. Helical screw 112 can include thermocouples 116 along helical ridge 114 or along screw root 118 which can monitor the temperature along various locations inside reactor vessel 14, for example at locations along the horizontal, vertical and radial axes.

Feedstocks that are mixed polymer materials include at least two different polymers, for example, a mixture of two or more of thermoplastic polymers, thermoset polymers, and blends thereof.

Polymer materials can include thermoplastic polymers such as, for example, polyethylene, polypropylene, polyester, acrylonitrile-butadiene-styrene (ABS) copolymers, polyamide, polyurethane, polyethers, polycarbonates, poly (oxides), poly(sulfides), polyarylates, polyetherketones, polyetherimides, polysulfones, polyurethanes, polyvinyl alcohols, and polymers produced by polymerization of monomers, such as, for example, dienes, olefins, styrenes, acrylates, acrylonitrile, methacrylates, methacrylonitrile, polymers of diacids and diols, lactones, polymers of diacids and diamines, lactams, vinyl halides, vinyl esters, block copolymers thereof, and alloys thereof. Polymers yielding halogenated material upon pyrolysis, for example, polyvinyl chloride, polytetrafluoroethylene, and other halogenated polymers, can be corrosive but can be tolerated.

Polymer materials can also include thermoset polymers such as, for example, epoxy resins; phenolic resins; melamine resins; alkyd resins; vinyl ester resins; unsaturated polyester resins; crosslinked polyurethanes; polyisocyanurates; crosslinked elastomers, including but not limited to, polyisoprene, polybutadiene, styrene-butadiene, styrene-isoprene, ethylene-propylene-diene monomer polymer; and blends thereof.

Mixed polymer materials can also include sustainable biomaterials such as biopolymers. Biopolymers can be sustainable, carbon neutral and renewable because they are made from plant materials which can be grown indefinitely. These plant materials come from agricultural non-food crops. Examples of biopolymers include, but are not limited to polylactic acid (PLA) and polyhydroxyalkanoate (PHA) which are used in multi-layer sheet for food packaging applications, for example.

Polymer material found in scrap material can have a combination of thermoplastic and thermoset polymers, for example, tires, paint, adhesive, automotive shredder waste (fluff), etc., and can be used as feedstock according to the various examples of the pyrolytic process herein.

Mixed polymer feed can include fillers, contaminants, etc. on average in the range of about 2% to about 25% by weight, in another example in the range of about 3% to about 20% by weight and in another example in the range of about 3% to about 15% by weight, and in yet another example less than about 7% by weight, all based on the average weight of solid feedstock.

In an example of any of the batch, semi-continuous, or continuous processes described above, the feedstock composition comprises from about 40% to about 90% by weight, in another example, from about 50% to about 85%, in another example from about 70% to about 80%, of the combined polymers of polyethylenes, polypropylenes and polystyrenes. The remaining polymers can include, but is not limited to, polyurethane, nylon, PET, and polyvinylchloride and the like.

Any of the feedstocks described above are introduced to the reactor as substantially shredded polymer and in another example at least a portion of the feedstock can be present in other forms. For example, feedstock may be present in the form of molded or extruded polymer, sheet, film or multi-layer films, and foam sheet or molded products.

Systems 10 and 100 of FIGS. 2 and 3 include a controller 86 for electrical control of any of the control parameters discussed herein, for example, temperature, feed rate, mass flow rate of exhaust gas, flow range of product gas, agitation rate and solid inert residue extractor rate. Controller 86 includes a processor 88 and a memory 89. The memory 89 is a non-transitory, machine-readable medium that can be employed to implement systems and methods described herein, for example based on computer-executable instructions (e.g. computer logic, control logic, etc.) running on the controller 86. The controller 86 can be integral with the reactor apparatus and implemented as a component of the reactor apparatus. In another example, the controller 86 can be implemented as a stand-alone computer system and/or may operate in a networked environment and in communication with one or more general purpose networked computer systems, embedded computer systems, routers, switches, server devices, client devices, various intermediate devices/nodes. The logical connections can include a local area network (LAN) and a wide area network (WAN). In some examples, a user can enter commands and information into the controller 86 through a user input device (not shown), such as a keyboard, a pointing device (e.g., a mouse), a touch screen, etc. These and other input devices are often connected to the processor 88 through a corresponding interface that is coupled to the system. The controller 86 is optionally connected to display 90 for review of output by controller 86. FIG. 2 also shows memory 89 which includes computer-executable instructions (i.e. logic) for determining proper control of the process.

Figure 4A:
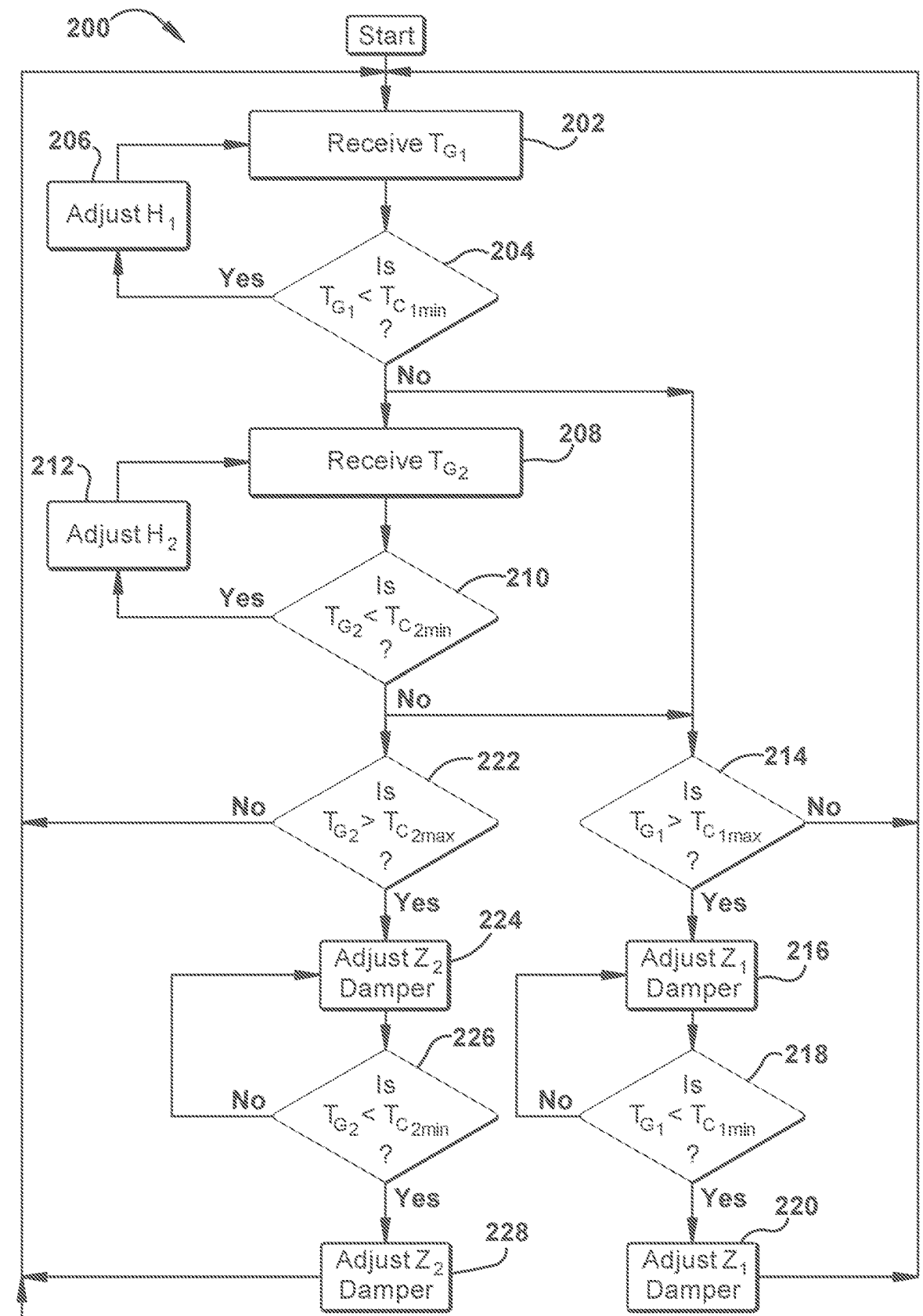
FIGS. 4a and 4b are flow diagrams illustrating methods of implementing a controller of a system for producing petroleum products, according to an example of the present invention.
Figure 4B:
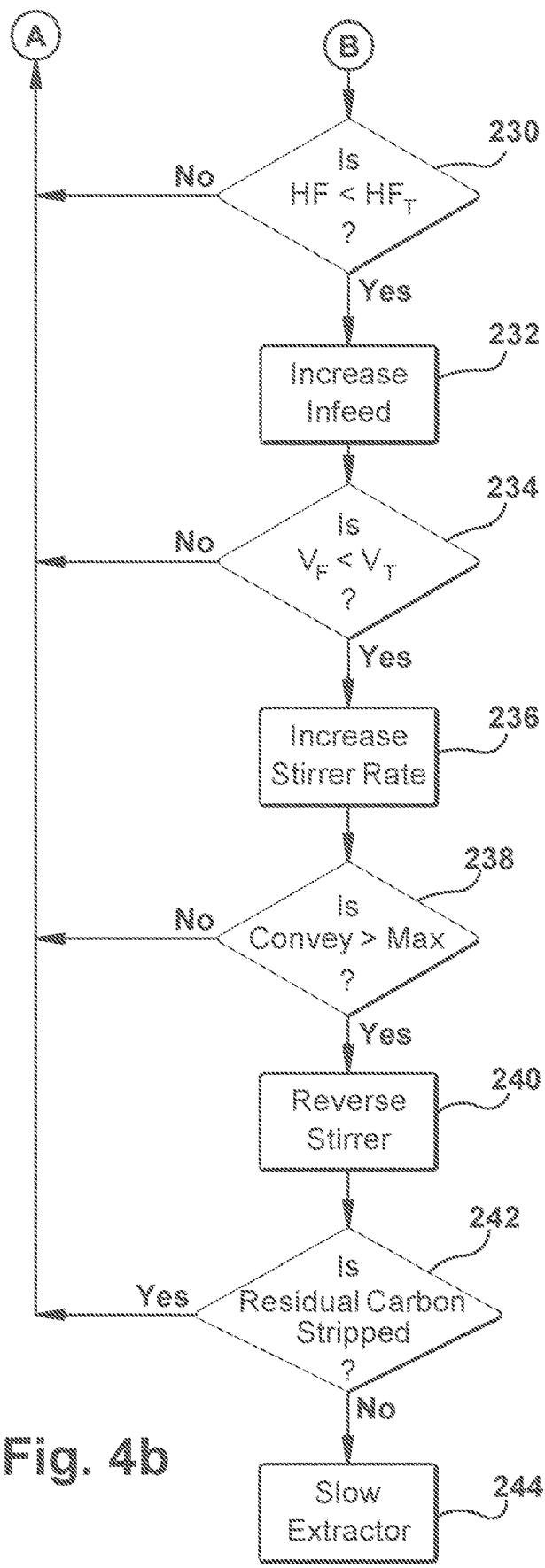

A flowchart illustration for implementing a method 200 for controlling the process for making petroleum products in accordance with an aspect of the present invention is shown in FIGS. 4*a* and 4*b*. Method 200 starts by sensing the gas temperature in the first reactor zone (FIGS. 2 and 3), as depicted at box 202. The method includes receiving a data signal that includes a temperature reading of gas present in the first reactor zone, as depicted in box 204. The gas temperature can be found in the channel of the first reactor zone or the top portion of reactor vessel near the gas exit port of the first reactor zone. If the logic at 204 determines the gas temperature in the first reactor zone is less than a predetermined minimum temperature then the controller will adjust the heat source H1 depicted at box 206 to increase the heat to the first heat zone Z1. The logic can either receive the temperature of the gas in the second heat zone Z2 at box 208 or can check to determine whether the temperature is too high and above a predetermined temperature maximum at 214. If the logic at box 214 determines that the temperature is too high then the damper in Z1 will be adjusted at 216 to control the temperature within the desired range. The controller will also check the gas temperature in the second reactor zone to determine whether the heat source and/or the damper needs to be adjusted at 224 and 228, respectively in the second reactor zone Z2. FIG. 4*b* shows subsequent controller logic steps to determine the heat flux and gas stream flow rate of product gas to control the feed rate and stirrer rates. Also, the controller will receive sensor data indicating the amount of hydrocarbons in the residual solids and will then control the extractor rate of the solids accordingly.

In another aspect of the present invention controller for controlling a process for producing petroleum products in a reactor apparatus includes a first control port for receiving a data from a first reactor zone and a first communications port for transmitting data to the first reactor zone of the reactor apparatus. The computing device includes a processing unit in communication with the first control port and the first communications port, and the processing unit includes control logic. The control logic is capable of receiving a data signal of the first control port that includes a temperature reading of a gas product in the first reactor zone and determining at least one of the heat input rate in the first reactor zone and the mass flow rate of the exhaust gas exiting the reactor apparatus in the first reactor zone.

Accordingly, in an example of the present invention controller for controlling a process for producing petroleum products in a reactor apparatus includes a first control port for receiving data from a first reactor zone and a second control port for receiving data from a second reactor zone of the reactor apparatus; a first communications port for transmitting data to the first reactor zone and a second communications port for transmitting data to the second reactor zone of the reactor apparatus. The controller includes a processing unit in communication with the first and second control ports and the first and second communications port, and the processing unit includes control logic. The control logic is capable of receiving a data signal of the first control port that includes a temperature reading of a gas product in the first reactor zone and a data signal of the second control port that includes a temperature reading of a gas product in the second reactor zone, and determining at least one of the heat input rate in the first reactor zone and the mass flow rate of the exhaust gas in the first reactor zone.

Controlling the rate of gas formation and the type of molecules in the gas phase through cracking and reformation involves several control variables. For example, control variables include, but are not limited to, the rate of feedstock into the reactor vessel 14, the energy input to the reactor apparatus 12 or reactor vessel 14, the heat flux, the mass flow of the gas product out of the reactor vessel 14, flow of heat along the outside of the vessel, the solid inert residue thickness, horizontal thermal gradient, radial thermal gradient, the shape of the reaction chamber, ratio of solid inert residue, liquid, foam, gas zones, the location of product gas removal, the vertical temperature gradient, and gas product residence time.

The control of the various control parameters may be controlled pneumatically, manually, by electrical control and combinations thereof, whether hard wired or wireless, or fiber optics. Manual control and/or control logic provide a control mechanism for the temperature profile within the reactor vessel in both vertical and horizontal axes, e.g. axis Y and axis X, respectively, and temperature profile along the arc of the reactor vessel within each reactor zone of the reactor vessel. The control of energy, for example the energy input and energy withdrawal, occurs within each reactor zone based on several variables, including but not limited to the feed rate, the mixing rate, and the length and depth profile of the mixed polymer melt pool (i.e. molten polymer) within the reactor vessel 14.

A temperature sensing element, for example a thermocouple, is disposed within reactor apparatus vessel 14 to provide an output signal which is representative of the temperature of any of reactor products in the gaseous state inside the reaction vessel. This signal can be an electrical signal that is communicated to/applied to the controller. Controller 86 compares this measured temperature with a set point signal and establishes an output signal which regulates damper 44. If the measured temperature should be less than a predetermined temperature control value, the heat sources is adjusted to increase the heat input rate of the first reactor zone. If the measured temperature is greater than the predetermined temperature control value, then heat valve or damper 46 is adjusted to increase the mass flow rate of exhaust gas through exhaust vent 40.

Examples have been included to more clearly describe particular embodiments of the invention and associated advantages. However, there are a wide variety of embodiments within the scope of the present invention, which should not be limited to the particular examples provided herein.

EXAMPLES

The following examples illustrate the process for producing fuel products according to various embodiments of the present invention. Experiments below were run using both a research size reactor apparatus and a commercial size reactor apparatus. Results of the petroleum products produced in the following examples are shown in FIGS. 5 through 10 and illustrate the product compositions obtained from several runs of different feed compositions at different loading produced consistent quality of naphtha, distillate and heavy oil fuel.

Examples 1 Through 6

A cylindrical, horizontal, reactor having an inner vessel and an outer shroud (as shown in FIG. 2) was used for the batch pyrolysis experiments described below. The volume of the reactor is approximately 19 liters of working volume. Stirring was provided by a paddle stirrer which wiped the wall of the vessel at a slow rate of speed (1-10 RPM). The vessel was heated by a ribbon burner positioned below the vessel and the heat was controlled by maintaining the combustion off gas temperature at a set point. Liquid product was captured by passing the pyrolysis vapor through a condenser.

Two different polymer mixture compositions of virgin resin pellets and regrind materials were used and the mixture compositions are shown in Table 1 below which illustrates the distribution of the polymer components.

TABLE 1

Feed Mixture Compositions, weight % of Resin

| Feed | PE | PP | PS | N6 | PET* | TPU | PVC* | Total % |
|------|-----|-----|-----|----|------|-----|------|---------|
| 1    | 35% | 25% | 20% | 3% | 7%   | 5%  | 5%   | 100     |
| 2    | 25% | 35% | 20% | 9% | 4%   | 4%  | 3%   | 100     |

*Regrind, compounded resin; all other resins were virgin, uncompounded resins.

The melt densities of the individual resins and the quantities of each resin were used to calculate the melt density of the feed polymer mixture as shown in Table 2.

TABLE 2

Calculation of Melt Density of Feed Mixture Compositions, g/cc

| Resin Melt Density g/cc | PE 0.72 | PP 0.70 | PS 0.70 | Nylon 6 0.97 | PET* 1.20 | TPU 0.97 | PVC* 1.30 | Formulation, g/cc @ Melt Temperature |
|---|---|---|---|---|---|---|---|---|
| Feed 1 | 0.25 | 0.18 | 0.14 | 0.03 | 0.08 | 0.05 | 0.07 | 0.79 |
| Feed 2 | 0.18 | 0.25 | 0.14 | 0.09 | 0.05 | 0.04 | 0.04 | 0.78 |

*Regrind, compounded resins from commercial resin reprocessor.

The melt density of the various feed polymer mixtures was calculated to determine the free volume of the reactor for each composition and loading as listed in Table 2. The levels of initial free volume represent the free volume in the reactor prior to the beginning of pyrolysis.

Feed 3 was prepared from shredded #3-#7 bales of scrap plastics obtained from a commercial Material Recovery Facility. These bales contained residual #1—polyester; #2—high density polyethylene remaining after recovery of bottles and jugs which were recycled mixed with #3—polyvinyl chloride, #4—low density and linear low density polyethylenes, #5—polypropylene, #6—polystyrene and #7—Other plastics.

Three different loading levels of feed material were used in the examples as shown in Table 3 providing different levels of free volume.

TABLE 3

Vessel Volume 1,188.3 in³ (19,473 cc³)

| Example | Sample Size | Melt Volume, cc/load | Feed Mixture Composition | % Melt Volume | % Free Volume |
|---|---|---|---|---|---|
| 1 | 1 lb. (454 g) | 583 | Feed 2 | 3 | 97 |
| 2 | 4 lb. (1,816 g) | 2,288 | Feed 1 | 12 | 88 |
| 3 | 4 lb. (1,816 g) | 2,334 | Feed 2 | 12 | 88 |
| 4 | 10 lb. (4,540 g) | 5,721 | Feed 1 | 29 | 71 |
| 5 | 10 lb. (4,540 g) | 5,835 | Feed 2 | 30 | 70 |
| 6 | 10 lb. (4,540 g) | 5,783[1] | Feed 3 | ~29[1] | ~71[1] |

[1]Based on estimated density of 0.785 g/cc for Feed 3. The same material was used in the Commercial Scale experiment, Example 7.

For each run, the mixed polymer materials were loaded into the pyrolysis vessel which was then sealed and purged with Argon to reduce the oxygen level to less than 1%. The vessel was heated to pyrolyze the material. The weight of the liquid and liquid yield was recorded. Duplicate runs were performed for each loading and for each polymer mixture composition, with the exception of the 1 pound loading (i.e. 97% free volume), in which only feed mixture composition 2 was run in duplicate. The results of the duplicate runs were averaged.

Figure 5:
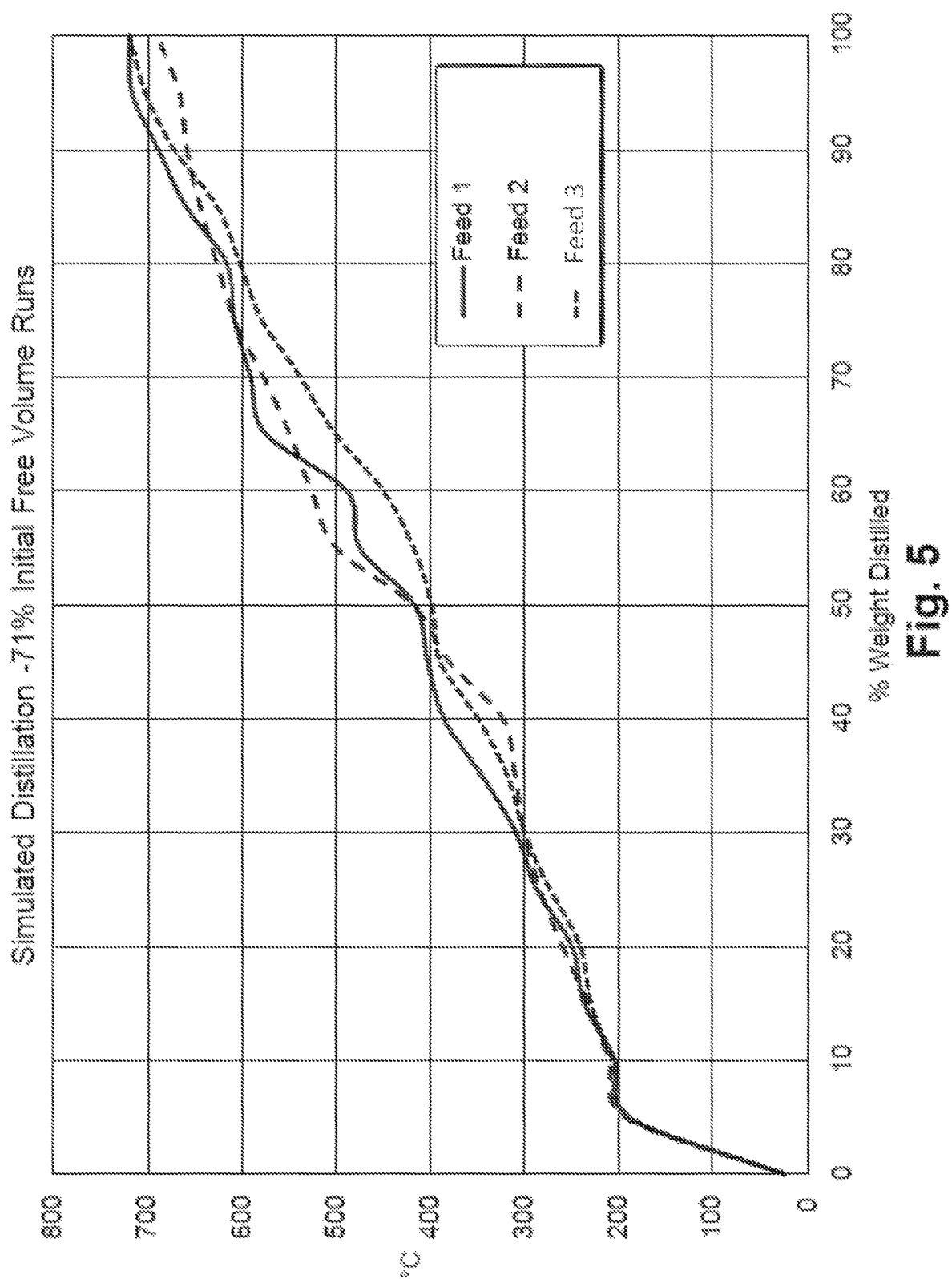
FIG. 5 is a graph illustrating the temperature versus percent weight loss of the condensable petroleum gas products which were produced using three different feed compositions of mixed polymer in a reactor having 71% free volume, according to an example embodiment of the present invention.
Figure 6:
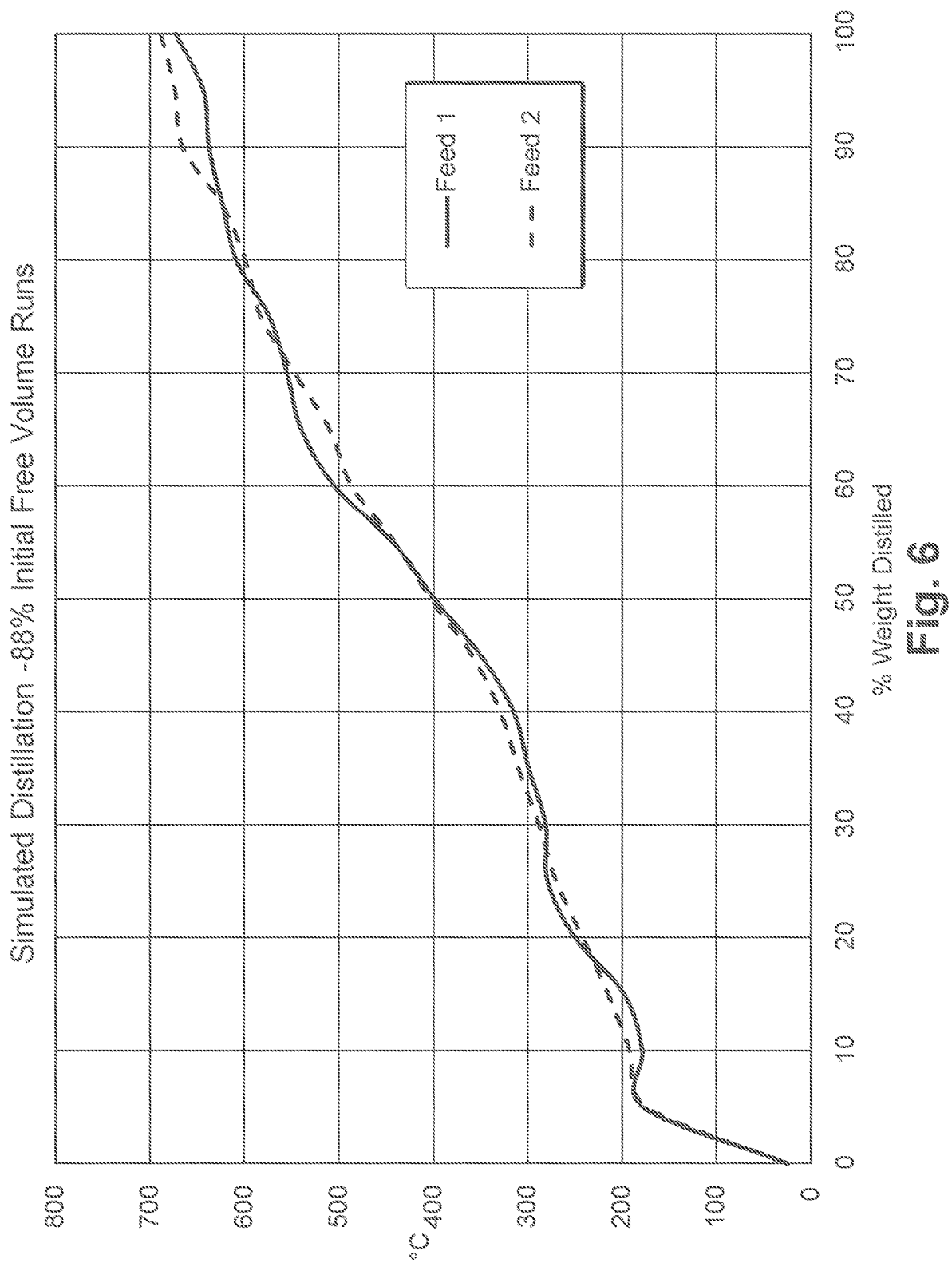
FIG. 6 is a graph illustrating the temperature versus percent weight loss of the condensable petroleum gas products which were produced using two different feed compositions of mixed polymer in a reactor having 88% free volume, according to an example embodiment of the present invention.
Figure 7:
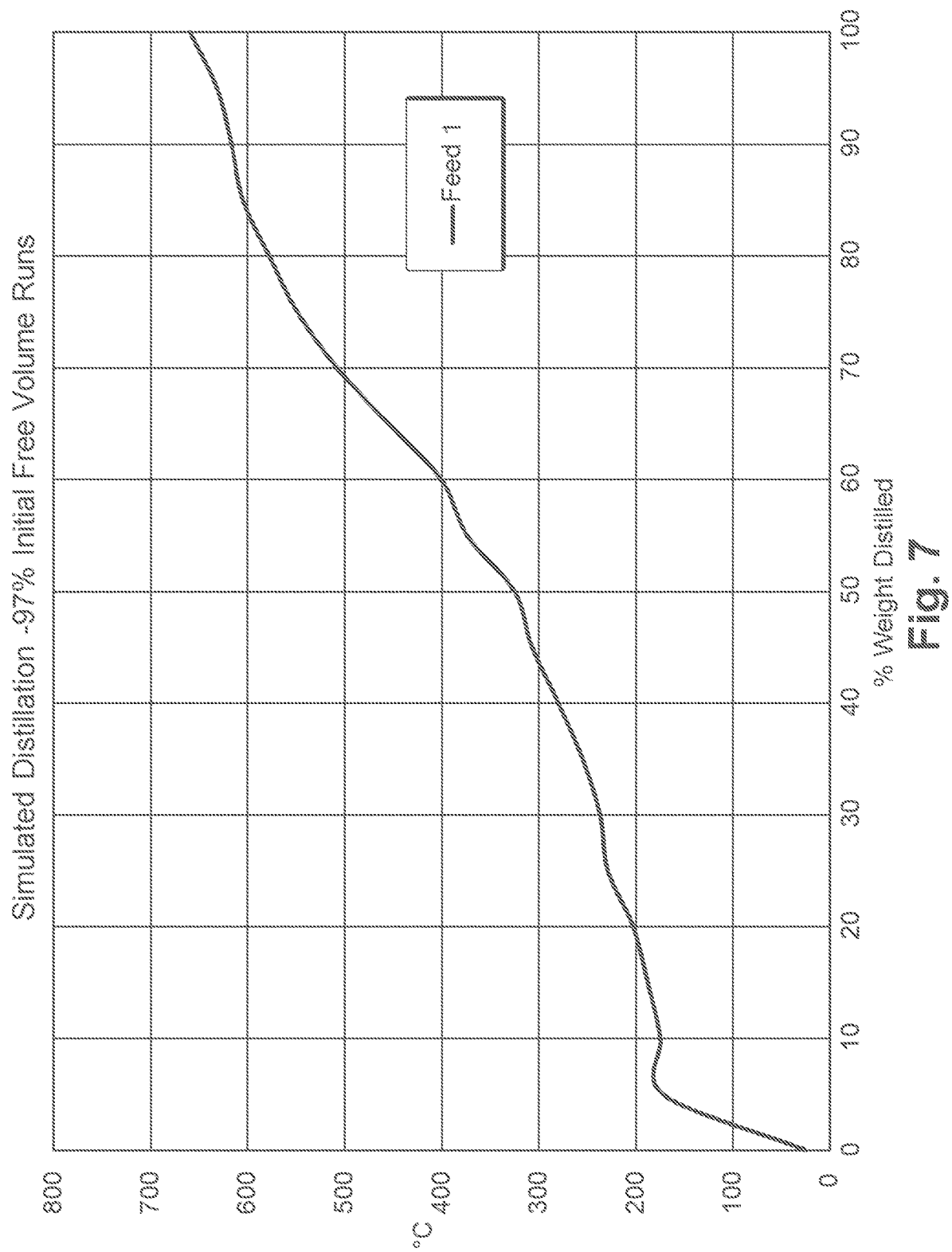
FIG. 7 is a graph illustrating the temperature versus percent weight loss of a condensable petroleum gas product which was produced using a feed compositions of mixed polymer in a reactor having 97% free volume, according to an example embodiment of the present invention.

The quality of the liquid products was assessed by ASTM D6352 (High Temperature Simulated Distillation) analysis on a composite sample of liquid from the duplicate runs of the same feed mixture composition and the same free volume. The data are shown in Table 4 below and represented in FIGS. 5, 6 and 7 which show temperature versus percent weight loss of the condensable petroleum gas products. The plots of FIGS. 5, 6 and 7 show the variation of resulting product between the runs of different feed compositions (Table 1) at the same free volume of 71%, 88% and 97%, respectively. The close proximity of the plots on each graph shows that the process herein produced high consistency product between runs having very different feed mixture compositions. FIG. 5 which represents the runs having 10 pounds of feed material (71% free volume) in the reactor shows that the consistent quality of the petroleum product even with the three feed compositions being different. The polymer mixtures of the three different feed compositions are disclosed in Table 1 and following. FIG. 6 shows the comparison of the results of Examples 2 and 3, the 4 pounds of feed material (88% free volume) in the reactor again showing consistent quality of the liquid product.

Figure 8:
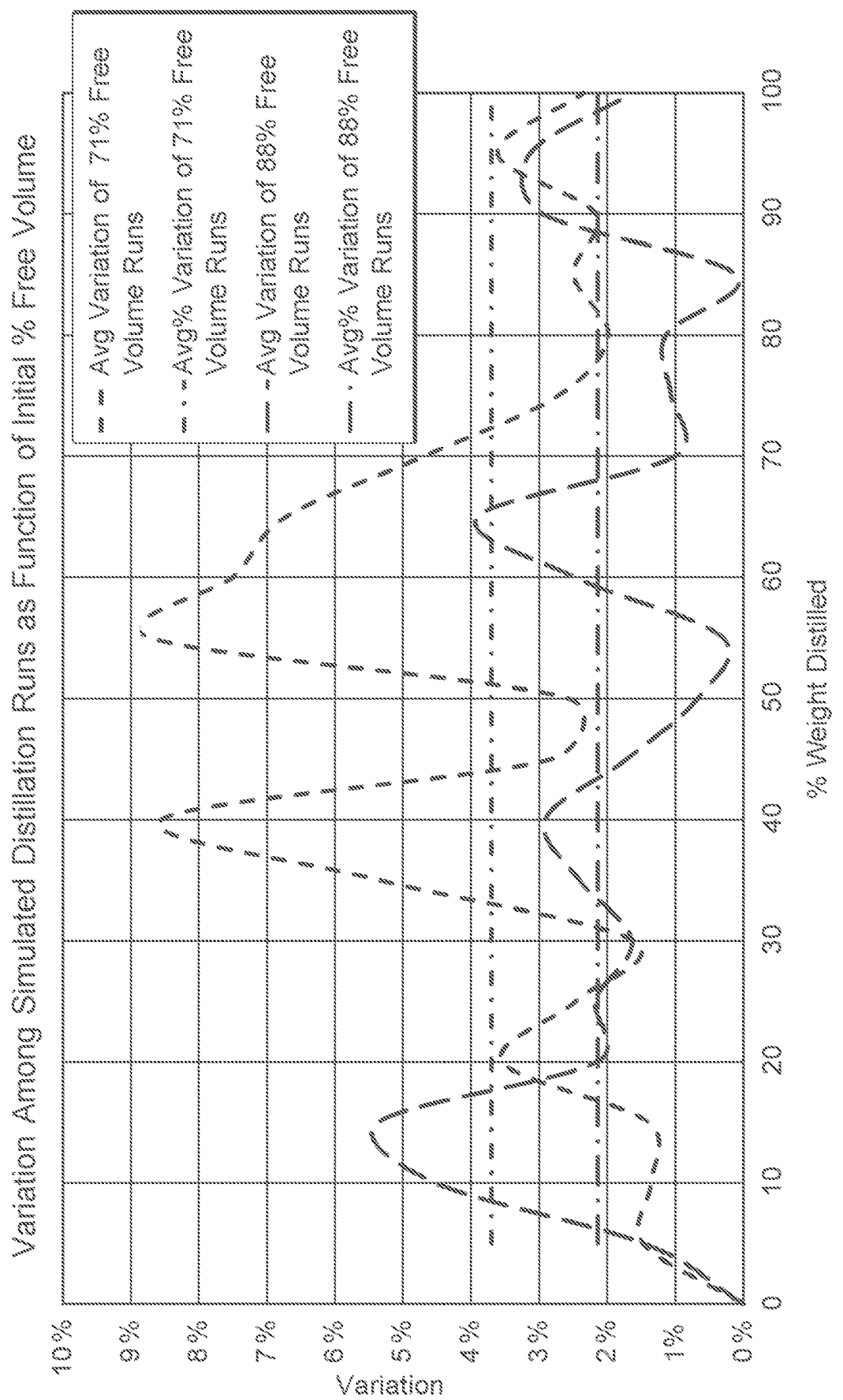
FIG. 8 is a graph illustrating the variation and average percent variation of condensable petroleum gas products which were produced in the reactors having 71% free volume and 88% free volume, according to an embodiment of the present invention.

FIG. 8 is a plot of the percent variation versus the percent weight distilled among runs for the 4 pound (88% free volume) and 10 pound (71% free volume) loadings. The average percent variation for each loading versus the percent weight distilled is also shown. The graph shows the consistency of the petroleum products is within about 4% and less than about 2% on average when the free volume is 88% and is less than about 5% and less than about 3% on average when the free volume is 71%. Greater consistency between compositions resulted with a runs having a greater free volume.

TABLE 4

ASTM D6352 High Temperature Simulated Distillation

| % Weight Loss | 97% Free Volume Ex. 1 1#Feed 2 | 88% Free Volume | | 71% Free Volume | | |
|---|---|---|---|---|---|---|
| | | Ex. 2 4# Feed 1 | Ex. 3 4# Feed 2 | Ex. 4 10# Feed 1 | Ex. 5 10# Feed 2 | Ex. 6 10# Feed 3 |
| | Distillation Temperature ° C. | | | | | |
| 0 | 25 | 25 | 25 | 25 | 25 | 25 |
| 5 | 172 | 178 | 174 | 190 | 194 | 188 |
| 10 | 175 | 179 | 192 | 205 | 211 | 207 |
| 15 | 188 | 198 | 215 | 237 | 233 | 230 |
| 20 | 203 | 250 | 242 | 250 | 260 | 241 |
| 25 | 229 | 279 | 270 | 287 | 284 | 273 |
| 30 | 237 | 281 | 288 | 309 | 300 | 300 |
| 35 | 255 | 299 | 310 | 345 | 310 | 318 |
| 40 | 280 | 315 | 329 | 386 | 323 | 349 |
| 45 | 307 | 350 | 359 | 403 | 380 | 390 |
| 50 | 325 | 399 | 403 | 417 | 419 | 399 |
| 55 | 374 | 443 | 441 | 475 | 500 | 418 |
| 60 | 401 | 505 | 487 | 489 | 526 | 450 |
| 65 | 455 | 540 | 510 | 575 | 550 | 501 |
| 70 | 508 | 555 | 547 | 591 | 577 | 538 |
| 75 | 549 | 574 | 583 | 608 | 608 | 579 |
| 80 | 578 | 609 | 599 | 617 | 627 | 602 |
| 85 | 605 | 624 | 625 | 660 | 645 | 627 |
| 90 | 617 | 638 | 666 | 689 | 659 | 672 |
| 95 | 632 | 644 | 674 | 717 | 667 | 703 |
| 100 | 660 | 673 | 689 | 719 | 690 | 720 |

Example 7

The quality of liquid product from a commercial scale run in a continuously fed process was determined as a comparison to the smaller batch unit runs. The commercial scale reactor is a cylindrical, horizontal, stirred reactor of approximately 104,775 L and was used to convert shredded plastic to hydrocarbon liquid, non-condensable gas and residual solids. The weight of the mixed polymer feed of shredded plastic and the volume of the reactor vessel were used to calculate the melt density of the feed polymer mixture. The melt density of the feed polymer feed was calculated to determine the free volume of the reactor and is listed in Table 5.

TABLE 5

Commercial Vessel Volume = 104,775 L

| Mass in Vessel | | Volume @ Melt Density of 0.78 g/cc | Melt Vol, L | % Melt Vol |
|---|---|---|---|---|
| 500 kg | 500,000 g | 641,026 cc | 641 | 0.612% |

The commercial scale reactor was loaded with approximately 475 kg of Feed 3. The vessel was purged with Nitrogen by pressurizing to an internal pressure of [10 psig] 517 mm Hg and venting three times, followed by a purge to 414 mm Hg before heating the vessel. Once liquid production was established, additional polymer shreds were added to the vessel via an extruder feeder at an average rate of approximately 500 kg/hr. The remaining plastic within the vessel was processed until there was no appreciable gas or liquid production. The heat applied to the unit was then stopped. A total of 5665 kg were converted to liquid hydrocarbon, non-condensable hydrocarbon gas and solid, inert residue.

Figure 9:
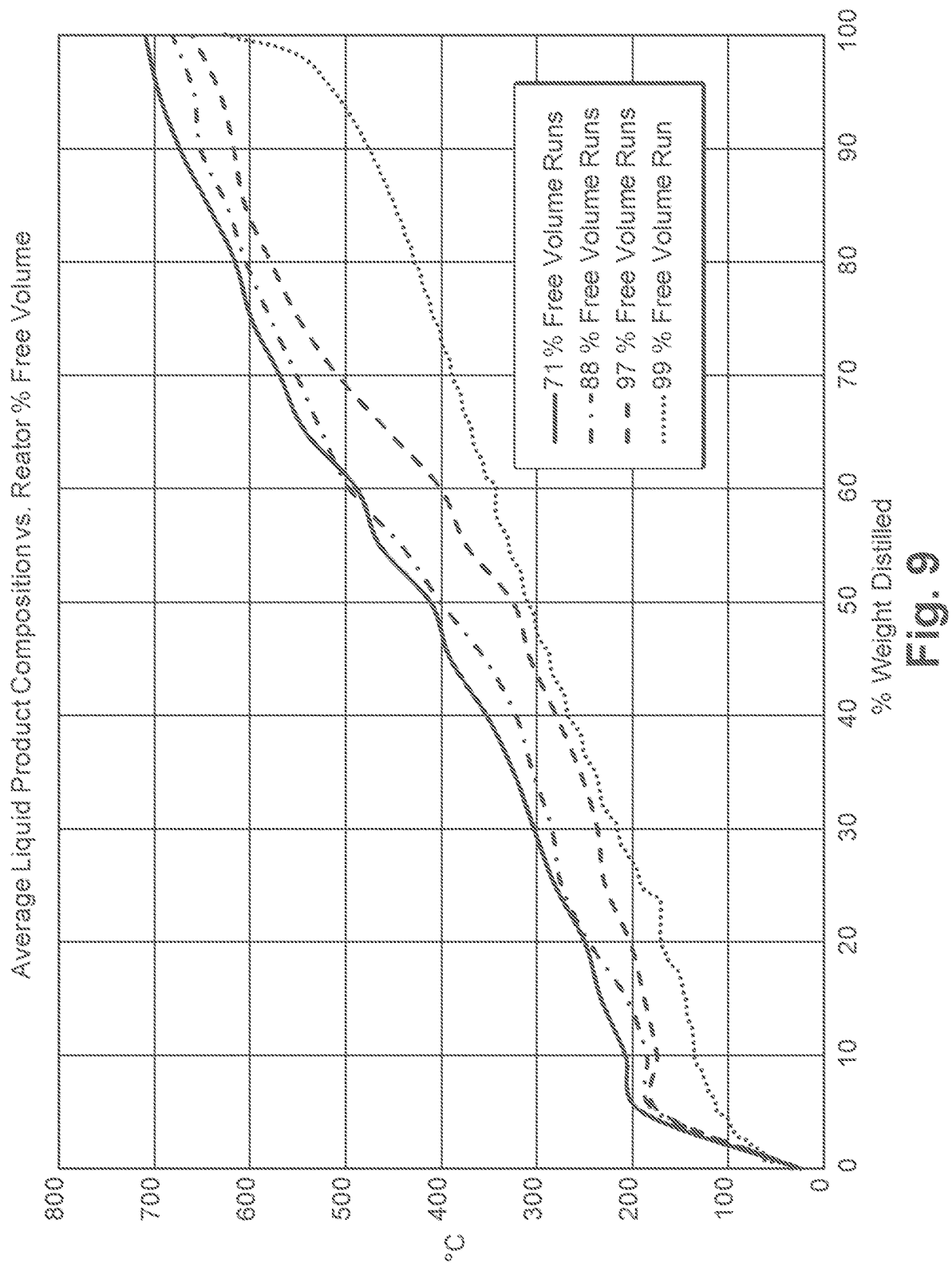
FIG. 9 is a graph illustrating plots of the a temperature versus percent weight loss of the condensable petroleum gas products which were produced in the reactors having 71%, 88%, 97% and 99% free volume, according to an example embodiment of the present invention.

FIG. 9 is a plot of the temperature versus percent weight loss of the condensable petroleum gas products of Examples 1 through 7. FIG. 9 shows the consistent quality of the product between the various polymer loadings. The close proximity of the plots on each graph shows that the process herein produced high consistency product between runs having very different amounts of loading.

FIG. 10 is a graph of a liquid petroleum chromatograph trace of the condensable portion of the gas petroleum product of Example 7.

The liquid yield of all runs of Examples 1 through 7 is listed below in Table 6.

TABLE 6

| Example No. | Feedstock Composition | Free Volume[1] % | Yield, % |
|---|---|---|---|
| 1 | Feed 2 | 97.10 | 79.20[2] |
| 2 | Feed 1 | 88.64 | 80.35[2] |
| 3 | Feed 2 | 88.42 | 86.80[2] |
| 4 | Feed 1 | 71.61 | 86.00[2] |
| 5 | Feed 2 | 71.04 | 92.95[2] |
| 6 | Feed 3[3] | 71.32 | 78.00 |
| 7 | Feed 3[3] | 99.39 | 59.65 |

[1]Based on melt volume of polymer charge.
[2]Average of 2 runs.
[3]Feed material from shredded #3-#7 bales; exact chemical composition undetermined.

The foregoing detailed description and examples have been given for clarity of understanding only. No unnecessary limitations are to be understood therefrom. Although the invention has been described with reference to several specific embodiments, the invention is not limited to the exact details shown and described, for variations obvious to one skilled in the art will be included. The description is not meant to be construed in a limited sense. Various modifications of the disclosed embodiments, as well as alternative embodiments of the inventions will become apparent to persons skilled in the art upon reference to the description of the invention. It is, therefore, contemplated that the appended claims will cover such modifications that fall within the scope of the invention. Such improvements, changes and modifications within the skill of the art are intended to be covered by the appended claims.

What is claimed is:

1. A reactor apparatus comprising:
a pyrolytic reactor vessel for producing petroleum gas products from a feedstock;
wherein the free volume of said reactor vessel is at least about 60%;
an outer shroud that substantially surrounds said reactor vessel;
a plurality of heat input sources that, independently, are capable of forming a plurality of heat exchange mediums that are located along the horizontal length of said reactor;
one or more inner walls for forming at least two fluid channels, said inner walls extending between said outer shroud and said reactor vessel and defining at least a first heated fluid channel of a first heated reactor zone and a second heated fluid channel of a second heated reactor zone, said heated reactor zones being capable of pyrolyzing at least about 82% by weight of said feedstock into said gas products;
wherein said at least one heated reactor zone has a gas product conduit so that said gas products formed in said reactor zone can be collected from said heated reactor zone of said pyrolytic reactor vessel, and
wherein said reactor vessel does not rotate.

2. The reactor apparatus of claim 1, comprising a second inner wall that extends between said outer shroud and said reactor vessel and defines a third fluid channel of a third reactor zone.

3. The reactor apparatus of claim 1, wherein said first heated fluid channel comprises an exhaust vent and wherein said second channel comprises a second exhaust vent.

4. The reactor apparatus of claim 3, wherein said first fluid channel exhaust vent comprises a flow control valve and said second fluid channel exhaust vent comprises a second flow control valve.

5. The reactor apparatus of claim 4, wherein each said flow control valve, independently, regulates the flow of exhaust heat from said channel.

6. The reactor apparatus of claim 5, comprising a temperature sensor located in said exhaust vent.

7. The reactor apparatus of claim 1, wherein each said heat exchange medium comprises a hot gas for, independently, heating each adjacent reactor zone thereto.

8. The reactor apparatus of claim 1, wherein said feedstock comprises a polymer or mixed polymers.

9. The reactor apparatus of claim 8, wherein said reactor vessel has an opening for feeding feedstock therethrough, and wherein said reactor vessel comprises an outlet port for discharging solid residue from said reactor vessel.

10. The reactor apparatus of claim 9, wherein said hot gas is heated air, wherein said reactor has a free volume of at least 80%, and wherein said polymer comprises polyethylene, polypropylene, polystyrene, polyvinyl chloride, polyester, polycarbonate, polymethyl methacrylate, or nylon, or any combination thereof.

11. The reactor apparatus of claim 10, wherein said petroleum gas product comprises naphtha, a distillate, or a gas oil.

12. The reactor apparatus of claim 1, wherein said reactor vessel contains additional heated fluid channels and adjacent reactor zones.

13. The reactor apparatus of claim 1 wherein said free volume of said reactor vessel is at least about 80%.

14. The reactor apparatus of claim 13, wherein said amount of said product gas at least about 93% by weight of said feedstock.

15. The reactor apparatus of claim 14, wherein said feedstock comprises polyethylene, polypropylene, polystyrene, polyvinyl chloride, polyester, polycarbonate, polymethyl methacrylate, or nylon, or any combination thereof.

16. The reactor apparatus of claim 1, wherein said feedstock comprises polyethylene, polypropylene, polystyrene, polyvinyl chloride, polyester, polycarbonate, polymethyl methacrylate, or nylon, or any combination thereof.

17. A process for producing petroleum gas products comprising:
    charging feedstock comprising a polymer or mixed polymer materials into said reactor vessel of claim 1;
    applying heat energy to said reactor vessel and converting said feedstock to molten material while advancing said molten material through said reactor vessel in an anaerobic operation; and
    controlling said heat energy input to said reactor vessel and controlling a temperature gradient within said reactor vessel to produce said petroleum gas product.

18. The process of claim 17, wherein said process contains no added catalyst, and wherein said reactor does not rotate.

19. The process of claim 17, wherein said process is a semi-continuous or a continuous process and wherein the composition of said feedstock varies during said process.

20. The process of claim 17, wherein said temperature gradient, in a reactor zone, independently, is the temperature differential between the temperature of the bottom surface of the reactor vessel, and the temperature of said petroleum gas product along the top portion of said reactor vessel and ranges from about 50° C. to about 450° C.

21. The process of claim 20, wherein the temperature of said petroleum gas product exiting the reactor ranges from about 315° C. to about 510° C.

22. The process of claim 20, wherein said temperature gradient of a particular reactor zone is controlled by conveying said heat exchange medium through a fluid channel zone adjacent to said particular reactor zone.

23. The process of claim 17, wherein said process is semi-continuous or continuous and the mass input rate of said feedstock ranges from about 100 kilograms/hour to about 5,000 kilograms/hour.

24. The process of claim 17, wherein a fungible gas product is obtained from said process that ranges in an amount of from about 50% to about 98% of said feedstock by weight.

25. The process of claim 17, wherein said reactor vessel comprises a plurality of sequential reactor zones along the horizontal axis of said reactor vessel, and said molten material is advanced through said plurality of reactor zones as it is advanced through said reactor vessel.

26. The process of claim 25, wherein said heat energy input to said reactor vessel is controlled by controlling said heat exchanging medium within each of said plurality of said reactor zones to control cracking and recombination reactions generated by pyrolysis of said feedstock.

27. The process of claim 25, wherein said heat energy input of each of the plurality of said reactor zones is controlled by controlling a temperature gradient within each of said plurality of said reactor zones.

28. The process of claim 27, wherein said temperature gradient within said reactor zones is controlled by conveying an exhaust gas in a first channel along a first reactor zone of the reactor vessel, and conveying an exhaust gas in a second channel along a second reactor zone of the reactor vessel.

29. The process of claim 25, comprising agitating said molten and liquid material during heating and advancing said molten and liquid material to each of said plurality of said sequential reactor zones of said reactor vessel.

30. The process of claim 25, wherein the number of said successive reactor zones along said reactor vessel through which said molten and liquid material advances is at least three.

31. The process of claim 17, comprising collecting said petroleum gas products, and wherein the petroleum gas products collected comprise at least about 50% by weight of condensable hydrocarbons based on the weight of gaseous products.

32. The process of claim 31, wherein said condensable hydrocarbons produced comprises:
    from about 10% to about 60% by weight of each, independently, of a naphtha, a distillate, or a gas based on the weight of gaseous product.

33. The process of claim 25, wherein heat energy applied to said reactor vessel is controlled at each of the plurality of said successive reactor zones of the reactor vessel.

34. The process of claim 17, wherein said feedstock comprises at least 60% by weight of mixed polymer scrap which comprises at least 65% by weight hydrocarbonaceous material.

35. The process of claim 17, wherein the composition of said feedstock material varies from about 10 to about 70% polyethylene, from about 10% to about 70% polypropylene, from about 10% to about 30% polystyrene, and from about 0% to about 30% of other polymeric materials comprising polyvinyl chloride, polyester, polycarbonate, polymethyl methacrylate, nylon, or any combination thereof.

* * * * *